(12) United States Patent
Griesbaum

(10) Patent No.: US 10,740,272 B2
(45) Date of Patent: Aug. 11, 2020

(54) INPUT CIRCUIT THAT CAN BE MADE REDUNDANT, INPUT CIRCUIT UNIT HAVING AT LEAST ONE INPUT CIRCUIT, AND METHOD FOR OPERATING THE INPUT CIRCUIT UNIT

(71) Applicant: Siemens Aktiengesellschaft, Munich (DE)

(72) Inventor: Wilhelm Griesbaum, Kandel (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 15/121,666

(22) PCT Filed: Feb. 25, 2015

(86) PCT No.: PCT/EP2015/053865
§ 371 (c)(1),
(2) Date: Aug. 25, 2016

(87) PCT Pub. No.: WO2015/128336
PCT Pub. Date: Sep. 3, 2015

(65) Prior Publication Data
US 2016/0371212 A1 Dec. 22, 2016

(30) Foreign Application Priority Data
Feb. 26, 2014 (DE) .................. 10 2014 203 429

(51) Int. Cl.
*G06F 13/40* (2006.01)
*G05B 19/042* (2006.01)

(52) U.S. Cl.
CPC ..... *G06F 13/4022* (2013.01); *G05B 19/0423* (2013.01); *G06F 13/4027* (2013.01); *G05B 2219/21123* (2013.01)

(58) Field of Classification Search
None
See application file for complete search history.

(56) References Cited

U.S. PATENT DOCUMENTS

| 3,593,307 A | | 7/1971 | Gouge et al. | |
| 5,025,486 A | * | 6/1991 | Klughart | H04W 52/0229 340/3.1 |
| 5,315,533 A | * | 5/1994 | Stich | H02J 9/062 307/66 |

(Continued)

FOREIGN PATENT DOCUMENTS

| CN | 101233418 | 7/2008 |
| CN | 102243291 | 11/2011 |

(Continued)

OTHER PUBLICATIONS

Office Action dated May 25, 2018 which issued in the corresponding Chinese Patent Application No. 201580010588.1.

(Continued)

*Primary Examiner* — Henry Tsai
*Assistant Examiner* — Aurangzeb Hassan
(74) *Attorney, Agent, or Firm* — Cozen O'Connor

(57) ABSTRACT

A method and input circuit unit having a first input circuit and a redundant second input circuit, wherein each input circuit includes an input for feeding a measurement current that can be obtained from a signaling device and that can be switched over and operated in such an input circuit unit, where the measurement current causes a voltage drop across a measurement resistor that can be evaluated as a measured value, where a parallel connection of the first and second input circuits causes division of the measurement current among the first and second input circuits, and where at least one input circuit include a device for compensating the decreased voltage drop across the measurement resistor resulting from the division of the measurement current.

5 Claims, 3 Drawing Sheets

(56) References Cited

U.S. PATENT DOCUMENTS

| | | | |
|---|---|---|---|
| 6,147,520 A | 11/2000 | Kothandaraman et al. | |
| 2004/0189271 A1* | 9/2004 | Hansson | H02M 3/33515 323/283 |
| 2005/0024895 A1* | 2/2005 | Mabanta | H02M 3/3385 363/18 |
| 2006/0018669 A1* | 1/2006 | Tanaka | H04B 10/66 398/202 |
| 2006/0273776 A1 | 12/2006 | Smart et al. | |
| 2006/0274468 A1* | 12/2006 | Phadke | H02H 9/001 361/93.1 |
| 2008/0100298 A1* | 5/2008 | Yun | H01M 10/48 324/430 |
| 2008/0159440 A1* | 7/2008 | Jaffer | H03K 5/1252 375/317 |
| 2009/0195257 A1 | 8/2009 | Hasenberg | |
| 2010/0213859 A1* | 8/2010 | Shteynberg | H05B 33/0815 315/224 |
| 2010/0308738 A1* | 12/2010 | Shteynberg | H05B 33/0812 315/185 R |
| 2011/0011934 A1* | 1/2011 | Iwamura | G06K 19/0701 235/435 |
| 2011/0148511 A1 | 6/2011 | Seiler et al. | |
| 2012/0081009 A1* | 4/2012 | Shteynberg | H05B 33/083 315/122 |
| 2012/0139615 A1 | 6/2012 | Zimmermann | |
| 2012/0245439 A1* | 9/2012 | Andre | A61B 5/0205 600/310 |
| 2012/0280327 A1 | 11/2012 | Canu et al. | |
| 2013/0137387 A1* | 5/2013 | Christensen | H04B 1/04 455/101 |
| 2013/0155737 A1* | 6/2013 | Jeong | H02M 3/33507 363/78 |
| 2015/0331049 A1* | 11/2015 | Luo | G06F 1/26 324/416 |
| 2016/0169945 A1* | 6/2016 | Mauder | G01R 31/3274 324/126 |

FOREIGN PATENT DOCUMENTS

| | | |
|---|---|---|
| CN | 102540939 | 7/2012 |
| DE | 10057486 A1 | 4/2001 |
| DE | 102008043199 A1 | 4/2010 |
| EP | 2461221 A2 | 6/2012 |
| WO | WO 2006/127373 A1 | 11/2006 |

OTHER PUBLICATIONS

Office Action dated Dec. 31, 2019 issued in India Patent Application No. 201637026612.

* cited by examiner

INPUT CIRCUIT THAT CAN BE MADE REDUNDANT, INPUT CIRCUIT UNIT HAVING AT LEAST ONE INPUT CIRCUIT, AND METHOD FOR OPERATING THE INPUT CIRCUIT UNIT

CROSS-REFERENCE TO RELATED APPLICATIONS

This is a U.S. national stage of application No. PCT/EP2015/053865 filed 25 Feb. 2015. Priority is claimed on German Application No. 10 2014 203 429.9 filed 26 Feb. 2014, the content of which is incorporated herein by reference in its entirety.

BACKGROUND OF THE INVENTION

1. Field of the Invention

The invention relates to a circuit, referred to below as an input circuit, for detecting input signals, and further relates to an input circuit unit having at least one input circuit as well as to a method for operating the input circuit. As an input circuit that can be made redundant, the input circuit makes possible single operation or redundant operation, i.e., operation together with a further input circuit, and thus a redundant or non-redundant detection of the respective input signal.

2. Description of the Related Art

Input circuits and redundant input circuits are known per se. In conventional input circuits, the relevant input signal is detected via inputs permanently designed for a respective measurement range, to which only digital or analog input signals can be fed. To make analog inputs for current measurement redundant, such as 4 to 20 mA, a two-pole input circuit is used.

EP 2 461 221 A2 discloses a control device with a circuit for processing signals of different sensor types. Here, two sensor types which can be connected deliver either analog current signals or PWM signals. In order to provide a reference potential required for evaluating such signals, the circuit comprises a pull-up resistor and a pull-down resistor. Both can be activated by switches which can be actuated by a microcontroller. The measurement current flowing into the circuit is guided via a low-pass filter to two input channels of the microcontroller simultaneously, and the microcontroller evaluates the signals on that input channel which belongs to the previously activated resistor.

US 2012/0280327 A1 and U.S. Pat. No. 6,147,520 disclose conventional circuits in which a single resistor can be bridged by means of a switch connected in parallel in order to adjust a respective overall resistance.

SUMMARY OF THE INVENTION

It is object of the present invention to provide a an input circuit that is able to be made redundant, as well as an input circuit unit with at least one such input circuit.

This and other objects and advantages are achieved in accordance by providing an input circuit having one input for feeding of an input signal obtainable from a signaling device in the form of a measurement current, and having an input resistor and a measurement resistor, where an electrically controllable switch is connected in parallel to the input resistor and where the measurement current invokes a voltage drop able to be evaluated as a measured value across the measurement resistor. The input circuit is able to be operated in accordance with a corresponding operating mode as a binary input circuit or as a current input circuit and is thus able to be switched over. The switch is provided for switching over the input circuit in accordance with the respective operating mode and is accordingly able to be controlled as a function of the operating mode. In its closed state, the switch bridges the input resistor. The input circuit thus becomes low-resistance, so that analog current measurements (operation as current input circuit) are possible. In its open state, the switch has no effect. The input resistor remains active, forms a voltage divider together with the measurement resistor and the potential of the center tap of the voltage divider can be evaluated for recognition of a high or a low level of the input signal (operation as binary circuit). Likewise, for operation of the input circuit as a voltage circuit, the input resistor, as an analog voltage input, causes a restriction of the voltage dropping across the measurement resistor (measurement voltage) and an adaptation to the measurement range circumstances.

In addition, the input circuit is also provided with means, referred to below, as cross coupling for automatic detection of a further redundant input circuit. Because of a redundant input circuit recognized via the cross coupling, an activation of a means for compensating for a reduced voltage drop resulting from a division of the measurement current is able to be effected, i.e., such as an activation of a multiplication that is performed by a microcontroller functioning as means for compensating. In this way, there is an automatic detection of a redundant input circuit and likewise automatic compensation for a falsification of a measured value only determined based on the voltage drop in the respective input circuit associated with the division of the measurement current among the then two input circuits.

The advantage of the inventive input circuit as well as of an input circuit unit with at least one such input circuit lies in the fact that a comparatively simple circuit is provided that can be switched over between analog current measurement and analog or digital voltage measurement by actuating an electrically controllable switch. Thus digital or analog input signals fed in can be detected and evaluated by means of one and the same circuit. By activation of the switch, the input resistor can be short-circuited. The input of the input circuit thus becomes low-resistance overall and, in this way, an analog current measurement can also be undertaken with the input circuit.

An input circuit with resistors able to be bridged by means of a switch is likewise known. DE 10 2008 043 199 A disclose a circuit of an I/O module for connection of a field device.

By contrast with the switchable input circuit in accordance with the invention, the I/O module is only intended for analog current measurement and accordingly the I/O module detects a measurement current delivered by the field device. The I/O module also provides a feed current for the field device, which is set as a function of the respective measurement current. In order to minimize the load on a battery of the I/O module intended for supplying the field device, individual resistors provided in a measurement branch of the I/O module can be bridged via a switch connected in parallel and thus immediately switched off. In this way a measurement resistor or a communication resistor is "switched off" when no current measurement or no HART communication is intended.

WO 2006/127373 A likewise discloses a circuit for supplying a field device with an operating voltage. This includes a measurement resistor and an adjustable voltage regulator connected in series thereto and this in its turn contains an amplifier, a Zener diode and two transistors combined into a Darlington circuit. A voltage resulting because of a respective measurement current in each case is amplified by the amplifier. This is used to activate a Zener diode and the Zener Diode is used to activate the Darlington circuit. The Darlington circuit functions as a final control element in the voltage regulator, but, unlike in the case of the switchable input circuit of the invention, does not cause a switchover as a result of different operating modes.

Two transistors combined in a Darlington circuit that, even with only a small control current, bring about a sufficient increase in the current amplification factor, also come into consideration as a particular embodiment of the switchable input circuit. As a result, even with only a small control current that only falsifies the measurement current to an insignificant extent, a secure electrical bridging of the input resistor results.

In a further embodiment of the switchable input circuit, a series circuit of the measurement resistor with an upstream input resistor functioning as a voltage divider connected after the respective input is provided, where the measurement resistor is connected to ground. The fact that the measurement resistor is connected to ground means that there is a tapping off of the measurement current within the respective input circuit without further measures being required. The input circuit can thus be operated as a single-pole input circuit (input circuit with a "single-ended" input). This simplifies the wiring of the respective sensor system to the input circuit or to a plurality of such input circuits, because only one wire has to be attached in each case.

The switchable input circuit described here and below is considered to be an input circuit able to be made redundant for operation together with a further (redundant) switchable input circuit. A combination of two such input circuits is referred to below as an input circuit unit. Similarly, a facility that allows at least two such input circuits to be accommodated and/or connected and thus to an extent function as a carrier unit for at least one input circuit is referred to as an input circuit unit.

The above-mentioned object is thus also achieved with an input circuit unit in accordance with the invention. To this end, there is the input circuit unit is provided with a first part circuit in the form of an input circuit as described here and below and a redundant, second part circuit in the form of a further such input circuit which can be combined with the first part circuit within the input circuit unit. Each part circuit/input circuit comprises an input for feeding a measurement current obtainable from an external signaling device. The measurement current causes a voltage drop across a measurement resistor able to be evaluated as a measured value (input signal), where a parallel connection of two input circuits causes the measurement current to be divided among the first and the second input circuit and thus basically falsifies the measured value obtainable as a result of the measurement current. To compensate for such a falsification, at least one input circuit has means for compensating for the reduced voltage drop across the measurement resistor resulting from the division of the measurement current.

The advantage of the present embodiment of the invention lies in the fact that a comparatively simple input circuit unit is achieved, in which two input circuits of the type described here and below are combined or are able to be combined, but which is also able to be operated with only one input circuit. The two input circuits, i.e., two identical or at least functionally-equivalent input circuits, function as part circuits basically able to be operated independently of one another and evaluate a measurement current that flows into the input circuit because of a current applied to its input or a potential applied to the input.

A falsification resulting from redundant operation of two input circuits because of the measurement current flowing in each input circuit is compensated for, so that a signal output from the respective input circuit and from the input circuit unit overall represents the actual value of the electrical variable output by the signaling device and of the resulting measurement current in each case.

In an embodiment of the input circuit unit, a microcontroller functions as a way to compensate for the reduced voltage drop resulting from the dividing up of the measurement current, where via the microcontroller a computational correction of the measured value, i.e., a computational correction in the form of a multiplication of the measured value by a predetermined or predeterminable factor, is able to be performed. A multiplication of a measured value by a factor is a measure easily able to be performed with a microcontroller. The respective factor quantitatively describes, as a predetermined or predeterminable factor, the division of the measurement current among the two input circuits. For a division of the measurement current, in which for example 97% of the measurement current flows into the first input circuit and the remaining 3% into the second input circuit, compensating for the associated falsification of the measured value can easily be achieved by the measured value being multiplied on the side of the first input circuit by a factor of 1.03 (=1+3%). The computational compensation on the side of the second input circuit, for the assumed division, can be achieved with a factor of 32.33 (=97%/3%). In accordance with the scheme illustrated, other factors are produced for other divisions of the measurement current.

It is also an object of the invention to provide a method for operating an input circuit unit as described here and below. With the operating method, in the case of a parallel connection of a first and a second input circuit, a division of the measurement current among the first and the second input circuit is compensated for.

In one embodiment of the method, a parallel circuit of a first and a second input circuit is detected automatically and as the result of such an automatic detection, in order to compensate for the division of the measurement current, a computational correction of the measured value obtainable because of the voltage drop across the measurement resistor is performed, i.e., a computational correction in the form of a multiplication of the measured value by a predetermined or predeterminable factor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained below on the basis of the drawings. Objects or elements corresponding to one another are provided in all figures with the same reference characters, in which.

DETAILED DESCRIPTION OF THE EXEMPLARY EMBODIMENTS

Figure 1:
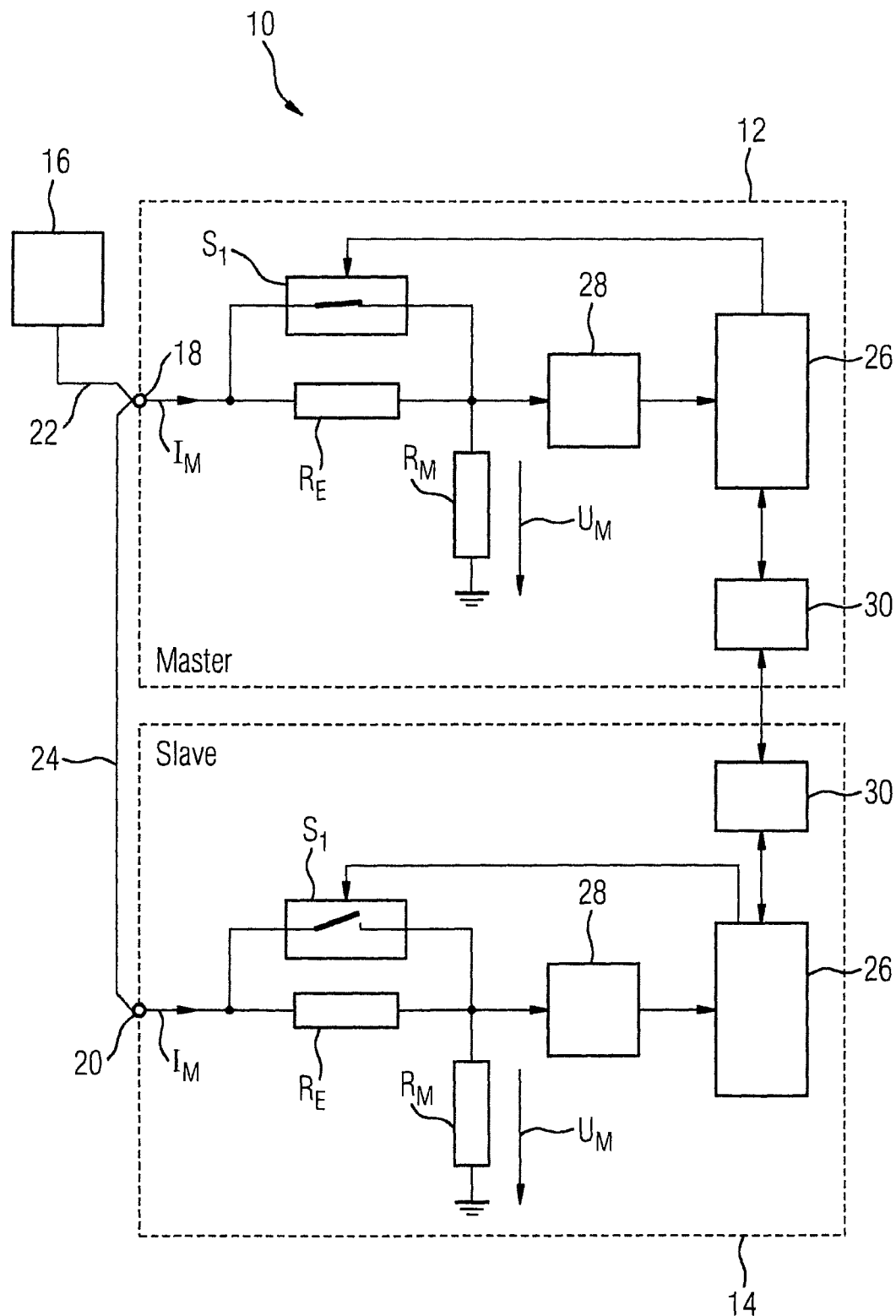
FIG. 1 shows a circuit unit for processing input signals with two redundant part circuits.

FIG. 1 shows a schematic diagram of a circuit unit for redundant signal detection, i.e., to detect input signals. The circuit unit functions accordingly as input circuit unit 10. The input circuit unit 10 comprises a first part circuit 12, which can be used for redundant signal detection, together with an identical or at least functionally-equivalent, complementary second part circuit 14. The part circuit or each part circuit 12, 14 of the input circuit unit 10 functions within the input circuit unit 10 as input circuit 12, 14, so that the designations input circuit 12, input circuit 14 and part circuit 12, 14 have the same meaning.

In an input circuit unit 10 with two such part circuits 12, 14, to make a distinction, a first part circuit/input circuit 12 is referred to below as the master circuit 12 (or master 12 for short) and a second complementary part circuit/input circuit 14 is accordingly referred to as the slave circuit 14 (or slave 14 for short). The input circuit unit 10 comprising one part circuit 12, 14 or both part circuits 12, 14, to distinguish it from the or from each part circuit/input circuit 12, 14 that it contains, is thus referred to below as the overall circuit 10.

The slave circuit 14 is optional within the overall circuit 10 and both the first part circuit 12 and also the second part circuit 14 can assume the functionality of the master circuit 12. With part circuits 12, 14 that are modular, plug-in or able to be releasably connected to the overall circuit 10 in any other suitable manner, the functionality of one of the two part circuits 12, 14, as master 12 or slave 14, is produced by the circumstances as to which of the two part circuits 12, 14 has first become active in the overall circuit 10.

In a manner known per se, a signal source referred to below as a signaling device 16, is connected to the input circuit unit 10 and thus to at least one part circuit 12, 14 included therein. Such a signaling device or any other measurement transducer usually involves a signal source located in a technical process to be controlled or monitored, such as a power station, i.e., an analog or digital sensor basically known per se. By means of such a signaling device 16 (and in practice with a plurality of such signaling devices 16), the state of the respective technical process is detected in a manner known per se.

In the schematic depicted in FIG. 1, it can be seen that the signaling device 16 is connected to the input 18 of the first part circuit 12 and to the input 20 of the second part circuit 14. This can be achieved by corresponding attachment of the or of each signal line 22 coming from the signaling device 16 or via a bridge 24 within the overall circuit 10.

With a signal from the signaling device 16, a measurement current $I_M$ flows into the respective part circuit 12, 14. By means of a switching element included in the part circuit 12, 14 and referred to below for short as switch $S_1$, the function of the respective input 18, 20 as a binary input or as an analog input for current signals can be set. The switch $S_1$ is able to be activated by a control device, such as a microcontroller 26 and a control current able to be output by the controller, included in the part circuit 12, 14. For the measurement, the part circuit 12, 14 includes a voltage divider with an input resistor $R_E$ and a measurement resistor $R_M$, connected to ground and thus functioning as a pull-down resistor. Here, the switch $S_1$ is connected in parallel to the input resistor $R_E$.

For operation as a current input, the switch $S_1$ is closed. This leads to the input 18, 20 of the part circuit 12, 14 being low-resistance. For operation of the part circuit 12, 14 as current input, a measurement current $I_M$ is detected in the usual value range, such as 0 to 20 mA or 4 to 20 mA. In the other cases, i.e., when the part circuit 12, 14 is functioning as a binary input or as an analog voltage input, the switch $S_1$ is open.

To obtain the voltage drop across the measurement resistor $R_M$ referred to below, a measured value $U_M$ is detected, for example, by a measurement system 28 comprising a multiplexer, a measurement amplifier and an analog-to-digital converter (ADC) and is read in by the microcontroller 26 and evaluated as the respective input signal. If the part circuit 12, 14 is operated as binary input, a digitized signal output by the measurement system 28 is evaluated by the microcontroller 26 in relation to a predetermined or predeterminable upper and/or lower threshold value and, if the threshold value is exceeded or not reached, then a logical high or logical low signal is created.

The master property is assigned via a cross coupling 30 to the respective redundancy partner, i.e., from the first part circuit 12 to the second part circuit 14 and vice versa. By means of the cross coupling 30, it is also recognizable for a part circuit 12, 14 whether a further part circuit 12, 14 is present as a redundancy partner. If a redundancy partner is present, the measurement current $I_M$ is divided up and a small extent flows via the input 20 of the slave circuit 14. On the part of the master circuit 12, this is able to be corrected computationally and, in the presently described embodiment, a correction is provided in the form of a multiplication by a fixed factor. The microcontroller 26 is considered as a way to provide such a correction, and for correction the microcontroller 26 accordingly causes the read-in input signal to be multiplied by the respective correction factor. If a redundancy partner is not plugged in, the measurement current $I_M$ flows entirely in the master 12 and accordingly no correction is necessary.

When inputs 18, 20 functioning as current input are made redundant, only the switch $S_1$ of the part circuit 12 functioning as the master 12 is closed. Here, significant proportion of the measurement current $I_M$ flows across the measurement resistor $R_M$ of the master circuit 12 and creates the voltage drop $U_M$. When inputs 18, 20 functioning as binary input (voltage input) are made redundant, both switches $S_1$, i.e., the switch $S_1$ of the part circuit functioning as the master 12 and the switch $S_1$ of the part circuit 14 functioning as the slave 14 are open.

Figure 2:
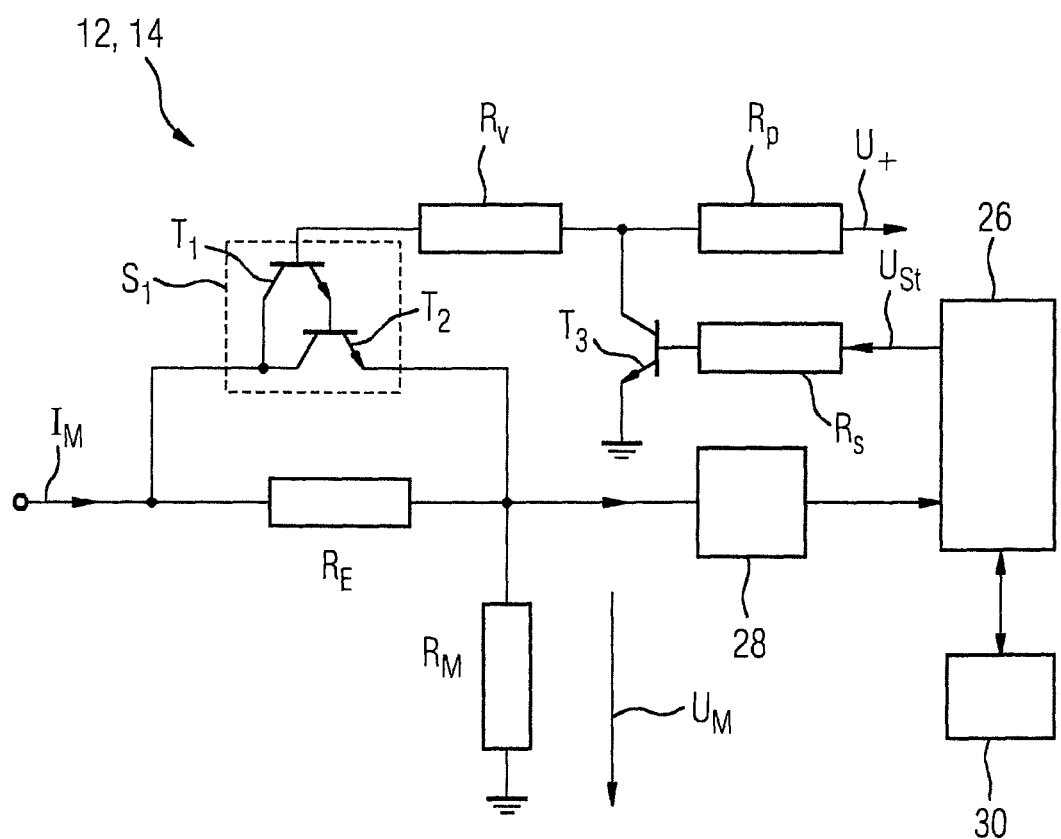
FIG. 2 shows a specific form of embodiment of a part circuit.

FIG. 2 shows a schematic of a particular embodiment as a realization of one of the part circuits 12, 14 or two redundant part circuits 12, 14. The switch $S_1$ (FIG. 1) is realized in this embodiment in the form of two transistors $T_1$, $T_2$ in a Darlington circuit. The switch $S_1$ or each of the switch elements/transistors $T_1$, $T_2$ functioning as switch $S_1$ is activated via a control signal ($U_{St}$) output by the microcontroller 26. Specifically, when the switch $S_1$ is realized in the form of two transistors $T_1$, $T_2$ combined into a Darlington circuit or a Darlington transistor, only a negligibly small falsification of the measurement current $I_M$ is produced by the electronic activation of the switch $S_1$.

In the embodiment shown in FIG. 2, the control signal $U_{St}$ generated by the microcontroller is given to a series transistor $T_3$ functioning as an inverting stage.

The series transistor $T_3$ is connected between ground and, via a pull-up resistor ($R_P$), an operating potential. The Darlington circuit is supplied with power from the operating voltage potential. For a control signal $U_{St}$ from the microcontroller 26 with a HIGH level the series transistor $T_3$ becomes conductive and the switch $S_1$ is open. For a control signal $U_{St}$ from the microcontroller 26 with a LOW level the series transistor $T_3$ is open and the Darlington circuit is connected to the operating voltage potential, so that the switch $S_1$ closes and the input resistor $R_E$ is short circuited. The series resistor $R_V$ is high-resistance, so that only a low control current flows, which only increases the measurement current $I_M$ insignificantly.

Individual advantages of the switchable input circuit unit 10 described here lie in the fact that a single connecting terminal is sufficient as an input 18, 20, because when the circuit is made redundant the measurement current $I_M$ can be conveyed via a bridge 24 (see FIG. 1) within the circuit to the slave circuit 14. The measurement current $I_M$, in redundant operation, but just as much in individual operation as well, is tapped off within the circuit to ground and thus does not require any further measures within the input circuit unit 10 or the respective part circuit 12, 14. The respective input type, i.e., "binary", "current analog" or "voltage analog" is able to be selected by the microcontroller 26 via software or predetermined or predeterminable parameters. The switchover is performed electronically via the microcontroller 26. Even with the input type "current analog" making the circuit redundant is possible by direct parallel connection of two parallel part circuits 12, 14. External additional measures, such as bridge settings within the input circuit unit 10, are not necessary. Binary values can also be measured as an analog voltage. The state is determined via a predetermined or predeterminable comparison threshold. Overload protection of the input circuit unit 10 can be achieved by a clocked opening and closing of the switch $S_1$ of the part circuit or of each part circuit 12, 14.

A part circuit 12, 14 of the type described here is also able to be operated autonomously as input circuit 12, 14, i.e., as an input circuit 12, 14 able to be switched over by a corresponding activation of the electronically controllable switch $S_1$ contained therein. Depending on the switch position of the switch S1, an analog current measurement or an analog or digital voltage measurement is performed via the input circuit 12, 14.

Figure 3:
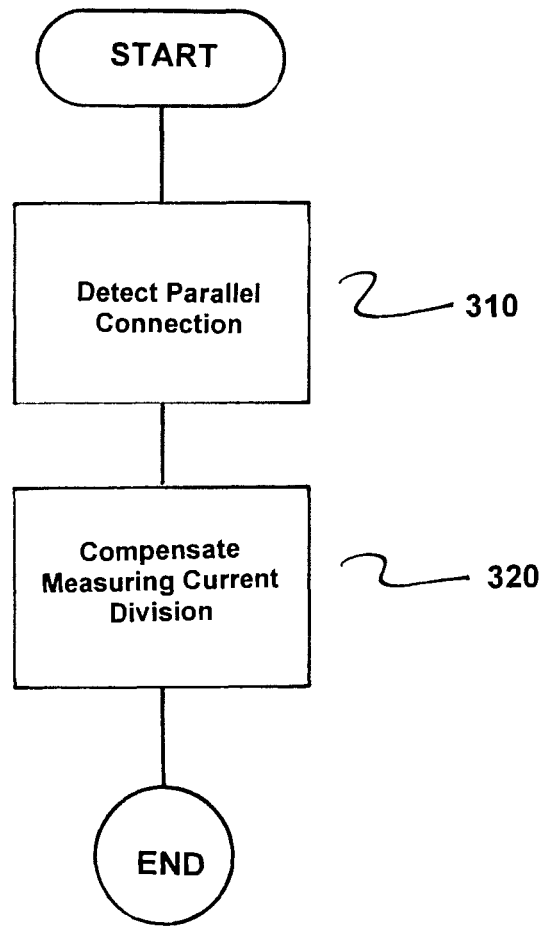
FIG. 3 is a flowchart of the method in accordance with the invention.

FIG. 3 is a flowchart of a method for operating an input circuit unit (10). The method comprises detecting a parallel connection of the first and the second input circuit (12, 14), as indicated in step 310. Next, a compensation of the division of a measuring current ($I_M$) among first and the second input circuits (12, 14) is performed, as indicated in step 320.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A switchable input circuit placeable into a redundant state, the switchable input circuit being operable in accordance with a respective operating mode as a binary input circuit or as a current input circuit, the switchable input circuit comprising:
    an input for receiving a measurement current obtained from a signaling device;
    an input resistor and a measurement resistor, each of which being connected to between the input and ground, said measurement current providing a voltage drop across the measurement resistor;
    a measurement system configured to evaluate the voltage drop as a measured value;
    a switch coupled in parallel to the input resistor and directly coupled to the measurement system, said switch being activatable electronically as a function of the operating mode of the input circuit, and in a closed state said switch bridging the input resistor;
    wherein a cross coupling operably to provide detection of a further input circuit which is placeable into a redundant state as a redundant input circuit; and
    means for compensating for a reduced voltage drop, said means for compensating for a reduced voltage drop being activated as a result of a detected redundant input circuit which occurs due to a division of the measuring current among the input circuit and the redundant input circuit.

2. The switchable input circuit that can be made redundant as claimed in claim 1, wherein the electronically activatable switch comprises a plurality of transistors combined to form a Darlington circuit.

3. An input circuit unit with a part circuit comprising the input circuit as claimed in claim 1, and a further part circuit comprising the redundant input circuit as claimed in claim 1, which is combinable with the input circuit, comprising a second input circuit;
    wherein a parallel connection of the input circuit and the second input circuit causes division of a measurement current among the input circuit and the second input circuit; and
    wherein at least one of the (i) the input circuit and the second input circuit includes means for compensating for a reduced voltage drop across the measurement resistor resulting because of the division of the measuring current.

4. The input circuit unit as claimed in claim 3, wherein means for compensating for the reduced voltage drop across the measurement resistor resulting because of the division of the measuring current comprises a microcontroller; and
    wherein a multiplication of the measured value by a predetermined or predeterminable factor performed by the microcontroller.

5. A method for operating a switchable input circuit unit; the method comprising:
    detecting a parallel connection of the switchable input circuit unit and a second input circuit unit via a switch coupled in parallel to an input resistor and directly coupled to a measurement system of the switchable input circuit, said switch being activatable electronically as a function of an operating mode of the switchable input circuit unit, and in a closed state said switch bridging the input resistor; and compensating for division of a measuring current among the switchable input circuit unit and the second input circuit unit;

wherein a parallel connection of the switchable input circuit unit and the second input circuit unit are recognized automatically and as a result of such an automatic recognition; and wherein said compensation for the division of the measurement current comprises multiplication of a measured value able to be obtained as a result of the voltage drop across the measurement resistor by a predetermined or predeterminable factor.

* * * * *